3,679,550
PROCESS FOR PURIFYING TRIARYL PHOSPHATES BY REDUCED PRESSURE DISTILLATION AND PHENOL INJECTION

Edward F. Orwoll, Baltimore, Md., assignor to FMC Corporation, New York, N.Y.
No Drawing. Filed Sept. 10, 1970, Ser. No. 71,267
Int. Cl. B01d 3/34
U.S. Cl. 203—38     4 Claims

ABSTRACT OF THE DISCLOSURE

Reaction mixtures, resulting from the phosphorylation of a mixture containing phenol; ortho-, meta- and para-alkylphenol; 2,6-, 2,4-, 2,5- and 3,5-dialkylphenols, 2,4,6- and 2,3,5-trialkylphenols with phosphorus oxychloride, containing tris (alkylphenyl) phosphate esters, unreacted alkylphenols and generally a catalyst residue are purified to remove the unreacted alkylphenols by (1) distilling the reaction mixture at an elevated temperature and reduced pressure to remove most of the unreacted alkylated phenols (generally hindered alkylated phenols), (2) sparging phenol into the remaining reaction mixture for one-half to several hours at elevated temperatures and reduced pressure to remove remaining hindered phenols not only by a simple entraining mechanism but also, apparently, by transalkylation and transesterification reactions, leaving essentially only unhindered phenols in the product phosphate ester, (3) distilling the sparged reaction mixture to separate the phosphate ester and unhindered phenols from the reaction residue which also generally contains a catalyst residue, and (4) further purifying the product by conventional means such as caustic washing and/or activated carbon treatment to reduce the color of the tris(alkylphenyl) phosphate esters.

BACKGROUND OF THE INVENTION

(A) Field of the invention

This invention relates to the purification of triaryl phosphate esters which contain undesired hindered alkyl phenols.

(B) Description of the prior art

Liquid triaryl phosphates, such as tricresyl phosphate, trixylyl phosphate, mixed xylyl cresyl phosphates and the like are recognized as having great economic value because of the extensive use of triaryl phosphates as plasticizers, gasoline additives, functional fluids, flame retardant additives in plastics and synthetic fibers, oil additives and so forth. The cost of cresols and other materials, traditionally the source of aryl radicals in triaryl phosphates, has increased greatly in recent years as cresols, xylenols and other similar materials obtained from tar acids and petroleum tars have been in short supply and difficult to obtain. Phenol is readily available at an attractive price, but triphenyl phosphate is a solid, melting at 49° C., and cannot be used in place of liquid triaryl phosphates in many applications.

The increasing industrial demand for cresols and other substituted phenols has resulted in increased manufacture of alkylated phenols for use in making liquid triaryl phosphates. Alkylation of phenols produces a mixture of products. For example, propylation of phenols produces a mixture of products ("alkylate") whose chief components are phenol; ortho-, meta-, and para-isopropylphenol; 2,6-, 2,4-, 2,5- and 3,5-diisopropylphenol; 2,4,6-, and 2,3,5-triisopropylphenol. The relative amounts of each of these components is variable depending upon the extent of propylation. Catalytic isomerization can also influence composition by reducing the proportion of ortho substitution. Several alkylated phenol compositions such as propylated phenols are utilized for conversion into various grades of phosphate esters of differing molecular weight and viscosity. Regardless of the particular composition of alkylate chosen, hindered phenols, for example 2,6-diisopropylphenol, is present to some extent. Hindered phenols cause difficulties in the conventional phosphorylation process. Similar mixtures of alkylated phenols containing hindered phenols are produced when phenol is butylated or amylated.

Phosphate esters, e.g. triaryl phosphates, are generally made by adding phosphorus oxychloride, $POCl_3$, to selected phenols, such as cresols, xylenols, and the like, and gradually heating the resulting reaction mixture to about 180° C. The reaction is accelerated by the presence of Friedel-Crafts Catalysts such as aluminum chloride, $AlCl_3$. In conventional processing, the triaryl phosphate is distilled in a simple still to remove unreacted phenols as a forecut, then the triaryl phosphate is distilled leaving in the still high boilers containing the catalyst residue. The distilled triaryl phosphate is then washed thoroughly with caustic (sodium hydroxide solution) to remove acids and phenols. The washed phosphate esters are then often treated with activated carbon to remove color bodies. This general process of producing triaryl phosphate esters is described in detail in Industrial Chemicals (2d ed.) by Faith, Keyes and Clark, John Wiley & Sons, Inc., New York, p. 777.

Alkylated phenols can be reacted with $POCl_3$ by the above described process to produce phosphate esters. Reaction rates of each of the individual alkylated phenols vary with the degree and position of substitution. The double ortho substitution of 2,6-dialkylphenol and 2,4,6-trialkylphenol render these phenols virtually inert under ordinary reaction conditions because of steric hindrance. Thus, after phosphorylation the unreacted portion of phenols is much enriched in inert components, the hindered phenols.

Hindered phenols such a 2,6-diisopropylphenol, 2,4,6-triisopropylphenol and similar butylated and amylated phenols are virtually insoluble in aqueous caustic and remain in the tris (alkylphenyl) phosphate product. Activated carbon treatment of tris (alkylphenyl) phosphates containing hindered phenols catalyzes the oxidation of the hindered phenol to the corresponding tetraalkyl diphenoquinone. Even without contact with carbon, the hindered phenols are subject to oxidation under ordinary processing and storage conditions. In the case of 2,6-diisopropylphenol, the corresponding diphenoquinone is highly colored and esters made from mixtures of alkylated phenols containing 2,6-diisopropylphenol are too highly colored for many uses, particularly for use as plasticizers. High-color phosphate esters must be sold at a lower price than low-color esters.

The tetraalkyl diphenoquinones tend to be sensitive to light and the 3,5,3′,5′ - tetraisopropyldiphenoquinone is bleached upon exposure to light. The bleaching transformation is not permanent; gradual reversion to the discolored state occurs in storage. Sodium borohydride was disclosed by V. C. Patel and E. F. Orwoll to permanently bleach and color-stabilize tris (alkylphenyl) phosphate esters containing 2,6 - diisopropylphenol and the corresponding diphenoquinone. The sodium borohydride reduces the diphenoquinone to the colorless 2,6-diisopropylphenol, which however remains in the product and is a potential source of discoloration if the product is exposed to oxidizing conditions. Sodium borohydride treatment is expensive in cost of materials and time as several hours to overnight treating times are required.

SUMMARY OF THE INVENTION

My invention provides a process for the removal of unreacted hindered alkylphenols from tris (alkylphenyl) phosphate esters, of the general formula

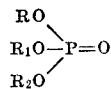

where R is alkaryl, and $R_1$ and $R_2$ are alkaryl or aryl, made by reacting phosphorus oxychloride with an alkylated phenol mixture containing phenol; ortho-, meta- and para-alkylphenol' 2,6-, 2,4- and 3,5-dialkylphenols; 2,4,6- and 2,3,5-trialkylphenols. According to my invention, a reaction mixture resulting from the phosphorylation of mixtures of phenols and alkylated phenols with phosphorus oxychloride, generally in the presence of aluminum chloride ($AlCl_3$) catalyst, is distilled at elevated temperatures and reduced pressure conditions suitable for removal of most of the unreacted alkylated phenols from the phosphate esters and catalyst residues. At 15 mm. of Hg the distillation temperature range is approximately 115–270° C. Phenol is then injected, generally by sparging, into the reaction mixture remaining in the distillation zone; the phenol immediately flashes, or otherwise very rapidly distills out of the reaction mixture and carries impurities, such as unreacted alkylphenols, out of the remaining reaction mixture. The phenol sparging, is conducted over a period of ½ to 5 hours, depending somewhat on the temperature which can vary between about 200 to 300° C.; the pressure must be correspondingly adjusted to prevent significant volatilization of phosphate esters. Convenient conditions are one hour at 230–265° C. at 15 mm. Hg pressure. At the end of the phenol injection an equilibrium amount of phenol is left in the phosphate ester, and remains with the ester after distillation but is easily removed in a subsequent caustic wash.

Phenol has several advantages over conventional sparge fluids used to remove volatile impurities. Steam is the most common sparge fluid but is hydrolytic in this application, and the product after refining fails to meet color specifications. Phenol is more effective than a permanent gas such as nitrogen because the vapor pressure of phenol is very close to the vapor pressure of components to be removed and it, therefore, exerts a powerful stripping action. Phenol is native to the system and thus introduces no impurities. The phenol used is condensed and totally recycled into the process and thus has no material cost.

In addition to the above properties, which are highly favorable for the physical removal of volatile impurities, it was found that phenol conferred unexpected benefits beyond a simple entraining mechanism. Analysis of still pot contents before and after the phenol sparge showed selective removal of hindered phenols. Analysis of the distillate surprisingly showed that the phenol treatment had increased the amount of monoalkylphenols in the system. These results imply selective transalkylation and transesterification reactions occurring to effectively convert the hindered phenols to unhindered phenols which are readily removed by caustic washing.

DESCRIPTION OF THE INVENTION AND THE PREFERRED EMBODIMENTS

This invention is widely applicable to phosphate esters made from alkylated phenols which contain hindered phenols—e.g. phenols containing alkyl groups on both positions ortho to the hydroxyl group. Phenols which contain hindered phenols are typically those made by alkylating phenol with unsaturted hydrocarbons such as ethylene, propylene, the butylenes and amylenes. A typical alkylated phenol is propylated phenol. Propylation of phenol results in a mixture of phenols so that the aryl and alkaryl radicals in the phosphate ester would include phenyl, monopropylphenyl, dipropylphenyl and tripropylphenyl.

Phenol is the essential reagent used to refine a crude triaryl phosphates of the general formula

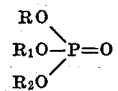

where R is alkaryl, and $R_1$ and $R_2$ are alkaryl or aryl made from alkylated phenols and containing unreacted hindered alkylphenols such as 2,6-dialkyl-phenol and 2,4, 6-trialkylphenol which cannot be removed from the crude phosphate ester by conventional caustic extraction. Objectionable phenols such as 2,6 - diisopropylphenol and 2,4,6 - triisopropylphenol are removed from a crude tri (alkylphenyl) phosphate such as tris(isopropylphenyl) phosphate by a combination of physical and chemical means. Phenol, injected into a hot tri(alkylphenyl) phosphate ester at reduced pressure and a temperature above the boiling point of phenol, flash distills out of the crude ester and the phenol vapors sweep volatile alkylphenols from the ester and the alkyl phenols and phenol are condensed and collected. Simultaneously with the phenol sparging and distillation from the ester, transalkylation occurs under distillation conditions and hindered phenols are converted to unhindered phenols which are readily removed by caustic washing.

In one experiment, a crude tris (isopropylphenyl) phosphate ester was stripped by distillation to remove the bulk of reacted phenols to give 555 grams of ester which was analyzed for its propylphenol content.

The amount of each alkylphenol in grams is listed in Table I. Phenol (75 grams) was then injected at 260–265° C. at 15 torr over a period of two hours. The residual ester (525 grams) and the distillate (105 grams) was again analyzed as shown in Table I.

TABLE I

| | Grams of alkylphenol | | | |
|---|---|---|---|---|
| | In pot before sparge | In pot after sparge | In distillate after sparge | Total after sparge |
| o-Isopropylphenol | 0.66 | 4.10 | 10.62 | 14.72 |
| m+p-isopropylphenol | 1.04 | 3.90 | 2.97 | 6.87 |
| 2,2-diisopropylphenol (2,6-DIPP) | 3.50 | 0.01 | 3.20 | 3.21 |
| 2,4-diisopropylphenol | 0.22 | 1.20 | 1.01 | 2.21 |
| 2,4,6-triisopropylphenol | 8.80 | 0.32 | 6.43 | 6.75 |
| Total | 14.22 | 9.53 | 24.23 | 33.76 |

Inspection of the table shows a striking increase in non-hindered phenols remaining in the pot as well as in the distillate. The objectionable hindered phenols were selectively removed. Transesterification as well as transalkylation, is apparent. Thus, recalculation of Table I in terms of millimoles of propylene bound in the propylphenols shows 174 millimoles before sparge and 311 after sparge, illustrating the transesterification which has occurred. Removal of bound (esterified), as well as free, 2,6-diisopropylphenol is believed to occur. Removal of bound 2,6-diisopropylphenol enhances the color stability of the phosphate ester product by reducing potential release of 2,6-diisopropylphenol by subsequent thermal or hydrolytic degradation of the ester.

Following the sparging step, a small second heads cut is taken to remove most of the retained phenol. The main cut of phosphate ester is then distilled from the kettle leaving a catalyst residue. The crude phosphate ester is further refined by conventional methods such as a caustic wash to remove residual phenols, water washes, vacuum drying and decolorizing carbon treatments. The product so obtained meets all commercial quality specifications including color, color stability in storage, acidity, etc.

The operable reactor temperature range for effecting the desired transalkylation and transesterification reactions, while sweeping out alkylphenols with the injected phenol, is about 200 to 300° C. At lower temperatures the rates of transalkylation and transesterification are undesirably slow; at substantially higher temperatures, thermal degradation becomes appreciable. Within this limit, the upper temperature chosen for conducting the phenol injection varies with the pressure, which is regulated so that the proportion of phosphate ester codistilling with the more volatile phenols is not excessive. Although volatilized ester is recovered from the condensate, high recycle ratios penalize productivity. Thus at 15 mm. of Hg, the preferred kettle temperature range is 230–265° C.; the sparging action under these conditions is effective without undue volatilization of phosphate ester. Pressure limitations are thus specified, i.e., the pressure is sufficiently low to cause the phenol to flash and distill from the kettle contents without significant accumulation in the kettle at the chosen operating temperature in the range of 200–300° C.

The preferable time range for injecting and flashing the added phenol is ½ to two hours. The time will vary with the heating capacity of the equipment, i.e., the rate at which the heat exchange capacity of the still can supply the heat of vaporization required for volatilization of phenol and the codistilling alkylphenols. Times of less than ½ hour may entail very high vapor velocities and consequent excessive entrainment of phosphate ester. Times appreciably longer than five hours serve no added useful purpose and reduce productivity.

The amount of phenol utilized for a sparging will vary to some extent with the amount of free and bound hindered phenols to be removed from the mixed phosphate ester. A suitable range is 5–25% by weight of the crude phosphate ester. The preferred range is 5–15% by weight of the crude phosphate ester; the most preferred amount is 10%.

Equipment requirements are very simple, viz, a simple still with any convenient source of heat exchange, a dip tube for injection for phenol into the crude ester, a simple de-entrainment device in the vapor lines, condenser and fraction receivers.

The phenol is conveniently injected as a liquid by means of a pump via the dip tube. If desired, phenol may be introduced as a vapor from a separate phenol vaporizer. Such an arrangement would correspondingly reduce the heat exchange requirement of the still during the phenol injection.

While the phenol injection is conveniently conducted as a batch process, it can likewise be conducted in a continuous manner, e.g., the crude ester mixture can be passed through one or more columns counter-currently to a stream of phenol injected towards the bottom of the columns under conditions causing the bulk of the phenol to pass upward through the column as a vapor, and the bulk of the ester to pass downward through the column as a liquid phase.

Fractionating stages are not required, and in fact are not desired since fractionation would tend to retain the undesired alkylphenols.

The following examples are deemed to illustrate the invention and are in no way limiting. All parts and percentages, unless otherwise noted, are by weight.

Example 1

The distillation apparatus comprised a one-liter, four necked glass flask equipped with a phenol feed dip tube, a sampling dip tube connected through a sampling valve to a high-vacuum system, a thermometer, mechanical agitator, and vapor line. The vapor line led to a de-entrainment bulb to separate and return entrained spray and thence to a condenser-receiver system under a pressure of 15 torr. Into the still was charged 652 grams of crude propylphenyl phosphate containing $AlCl_3$ catalyst and excess unreacted mixed phenols. The bulk of the unreacted phenol was removed by distillation to a pot temperature of 285° C. at 15 torr. The still contents weighed 555 grams at that point. Chromatographic analysis show the composition listed in Table II for "Pot Sample No. 1." Liquid phenol (75 grams) was added via the dip tube in two hours at a pot temperature of 260–268° C. and pressure of 15 torr. During the phenol injection, 105 grams of distillate, comprising 21 percent phosphate esters and 79 percent mixed phenols, was collected. The pot content was sampled and analyzed with results as shown in Table II for "Pot Sample No. 2." Distillation was then continued at a pot temperature of 288° C., and an overhead temperature of 274° C., whereby an intermediate cut of 9 grams was collected. Products cuts, totaling 394 grams, were then taken up to pot temperature 311° C., and vapor temperature of 291° C. at 15 torr. The combined product cuts, analyzed by gas chromatography, were found to contain 0.22 percent of total phenols, including alkylphenols. 2,6-diisopropylphenol was barely discernible in the chromatogram and its concentration was estimated to be 10 p.p.m. The product was washed with 2 percent aqueous caustic soda, and with water, dried, treated with carbon black and filter aid and filtered. The filtrate was almost colorless (Pt-Co Color* 50); its formulation with polyvinyl chloride formed a flexible film that was not discolored.

TABLE II

| | Total phenols, percent | Isopropylphenols, percent | | | | | |
|---|---|---|---|---|---|---|---|
| | | Phenol, percent | Ortho | Meta plus para | 2,6-di-propyl | 2,4-di-propyl | 2,5 plus 3,5-di-propyl | 2,4,6-tri-propyl |
| Pot sample No.: | | | | | | | | |
| 1 | 2.90 | 0.335 | 0.118 | 0.187 | 0.631 | 0.309 | | 1.588 |
| 2 | 3.57 | 1.663 | 0.782 | 0.742 | 0.003 | 0.229 | 0.0079 | 0.061 |

Inspection of Table II shows the remarkable specificity of the process for removal of the hindered phenols, 2,6-diisopropylphenol and 2,4,6-triisopropylphenol. The other isopropylphenols, all readily removed by caustic treatment, are increased in concentration by the phenol treatment.

Example 2

Into the apparatus of Example 1 was charged 577 grams of a crude phosphorylation mixture. Most of the unreacted alkylphenols, 54 grams, were removed by distilling to pot temperature 288° C., and overhead temperature of 272° C. at 15 torr. Phenol (50 grams) was added in two hours at a pot temperature 265–280° C. at 15 torr and 84 grams of distillate was removed. An intermediate cut of 11 grams was then taken to a pot temperature of 286° C. Products cuts, totalling 434 grams, were collected up to pot temperature 309° C. at 15 torr. After refining as in Example 1, the product was virtually colorless (Pt-Co Color 40) and its formulation with polyvinyl chloride was not discolored. Analysis by gas chromatography showed no detectable 2,6-diisopropylphenol.

Comparison Example A

Part of the same crude phosphorylation mixture of Example 2 was distilled in the manner of Example 2 with the exception that phenol was not injected into the mix-

---

*Pt-Co Color—ASTM D–1209 Standard Method of Test for Color of Clear Liquids (Platinum-Cobalt Seale).

ture. The product cut was again collected at a pot temperature range of 288° to 310° C. The product after refining was yellow in color (Pt-Co 250) and contained 60 p.p.m. of 2,6-disopropylphenol. Its polyvinyl chloride formulation was discolored.

Example 3

Approximately 11,000 pounds of a crude isopropylphenyl phosphate mixture, containing unreacted phenols and AlCl₃ catalyst, was charged into a steel distillation vessel equipped with a dip tube for admitting phenol, a vapor line fitted with an entrainment separator, and several condensate receiver tanks. The contents were stripped of the bulk of the free phenols by distillation of a forecut up to pot temperature of 270° C. at 15 torr. The temperature was reduced to 265° C., and 1,000 pounds of phenol was admitted through the dip tube over a period of 90 minutes at a pressure of 15 torr, and a temperature range of 230–265° C. Approximately 1,500 pounds of condensate was collected during this period. The contents were then again stripped to a pot temperature of 270° C. at 15 torr, at which point collection of product was started. Distillation was continued to virtual dryness. The distilled product was analyzed and found to contain 0.06 percent of total phenols but no detectable amount of 2,6-diisopropylphenol. The product was refined by washing with 2 percent caustic and with water, drying, treating with activated carbon and filter aid, and filtering. The finished product color was Pt-Co 60; its test formulation to polyvinyl chloride film showed no discoloration.

Comparison Example B

Approximately 11,000 pounds of the same crude phosphate ester described in Example 3 was distilled in the apparatus and in the manner described in Example 3, with the exception that no phenol was injected into the still. The forecut was removed by distillation up to a pot temperature of 270° C. at 15 torr. The product fraction was collected in the manner of Example 3. The refined product discolored its polyvinyl chloride formulation and was found to contain 50 p.p.m. of 2,6-diisopropylphenol.

What is claimed:
1. A process for removing unreacted hindered alkylphenols from a reaction mixture resulting from phosphorylation of mixtures of phenols, alkylphenols and hindered alkylphenols with phosphorus oxychloride to produce tris (alkylphenyl) phosphate esters of the general formula

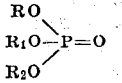

where R is alkaryl, and $R_1$ and $R_2$ are alkaryl or aryl comprising: (1) distilling the reaction mixture at reduced pressure and an elevated temperature to remove most of the unreacted phenols, alkylphenols and hindered alkylphenols from the reaction mixture; (2) injecting phenol into the reaction mixture for ½ to 5 hours at an elevated temperature and reduced pressure such that phenol very rapidly distills out of the remaining reaction mixture; (3) distilling the phenol injected reaction mixture at an elevated temperature and reduced pressure to separate phenols and the tris (alkylphenyl) phosphate esters from the remaining reaction mixture.

2. The process of claim 1 in which the phenol is injected into the reaction mixture at a temperature between 200° and 300° C.

3. The process of claim 1 in which the alkylphenyl groups, in the tris (alkylphenyl) phosphate esters, are made by the propylation of phenol.

4. The process of claim 1 in which the phenol is injected into the reaction mixture for ½ to two hours.

References Cited
UNITED STATES PATENTS

| | | | |
|---|---|---|---|
| 2,358,133 | 9/1944 | Stoesser et al. | 260—990 |
| 3,591,666 | 7/1971 | Pellegrini et al. | 260—990 |
| 3,059,015 | 10/1962 | Pickard et al. | 260—990 |
| 3,077,491 | 2/1963 | Seglin et al. | 260—990 |
| 3,219,547 | 11/1965 | Wheeler | 260—990 |

WILBUR L. BASCOMB, JR, Primary Examiner

U.S. Cl. X.R.
203—65, 73; 260—990